358-140. XR 3,478,164 SR CROSS REFERENCE SEARCH ROOM

Nov. 11, 1969 G. R. SOUTHWORTH 3,478,164

SCAN CONVERTER AND TELEVISION SCAN CONVERTER SYSTEM

Filed Dec. 23, 1966 4 Sheets-Sheet 1

Tx 5055

INVENTOR
GLEN R. SOUTHWORTH
BY
Sheridan and Ross
ATTORNEYS

INVENTOR
GLEN R. SOUTHWORTH
BY Sheridan and Ross
ATTORNEYS

SCAN CONVERTER AND TELEVISION SCAN CONVERTER SYSTEM

Filed Dec. 23, 1966

INVENTOR
GLEN R. SOUTHWORTH
BY *Sheridan and Ross*
ATTORNEYS

SCAN CONVERTER AND TELEVISION SCAN CONVERTER SYSTEM

Filed Dec. 23, 1966 4 Sheets-Sheet 4

INVENTOR
GLEN R. SOUTHWORTH
BY Sheridan and Ross
ATTORNEYS

United States Patent Office 3,478,164

Patented Nov. 11, 1969

3,478,164
SCAN CONVERTER AND TELEVISION SCAN CONVERTER SYSTEM

Glen R. Southworth, Boulder, Colo., assignor to Colorado Video Incorporated, Boulder, Colo., a corporation of Colorado Filed Dec. 23, 1966, Ser. No. 604,232
Int. Cl. H04n 5/76
U.S. Cl. 178—6.6 9 Claims The present invention relates to a television scan converter system and in particular to the use of that system with a particular form of scan converter.

It is an object of the present invention to disclose equipment and techniques for accepting data at many rates, converting said data to a standard television format, and continuously and indefinitely displaying said data at standard television rates.

It is a further object of the present invention that said data being displayed shall include waveforms, X–Y plots, raster presentations and television images among others, with the ability to translate "slow scan" television signals to normal viewing rates or low frequency data to standard television formats.

It is also an object of the present invention to provide rapid erasure of either all or part of stored data, and subsequent addition or insertion of new data.

Other objects and advantages will be apparent from a detailed description of the invention and from the appended drawings and claims.

Figure 7:
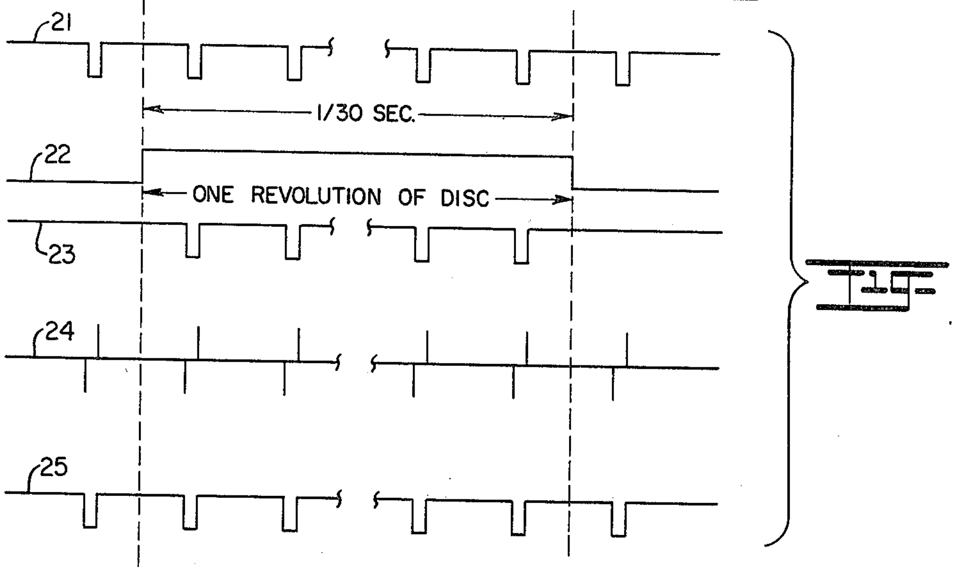
Figure 8:
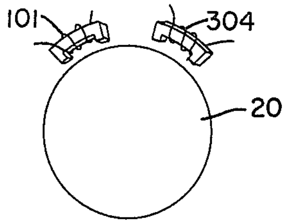
Figure 3:
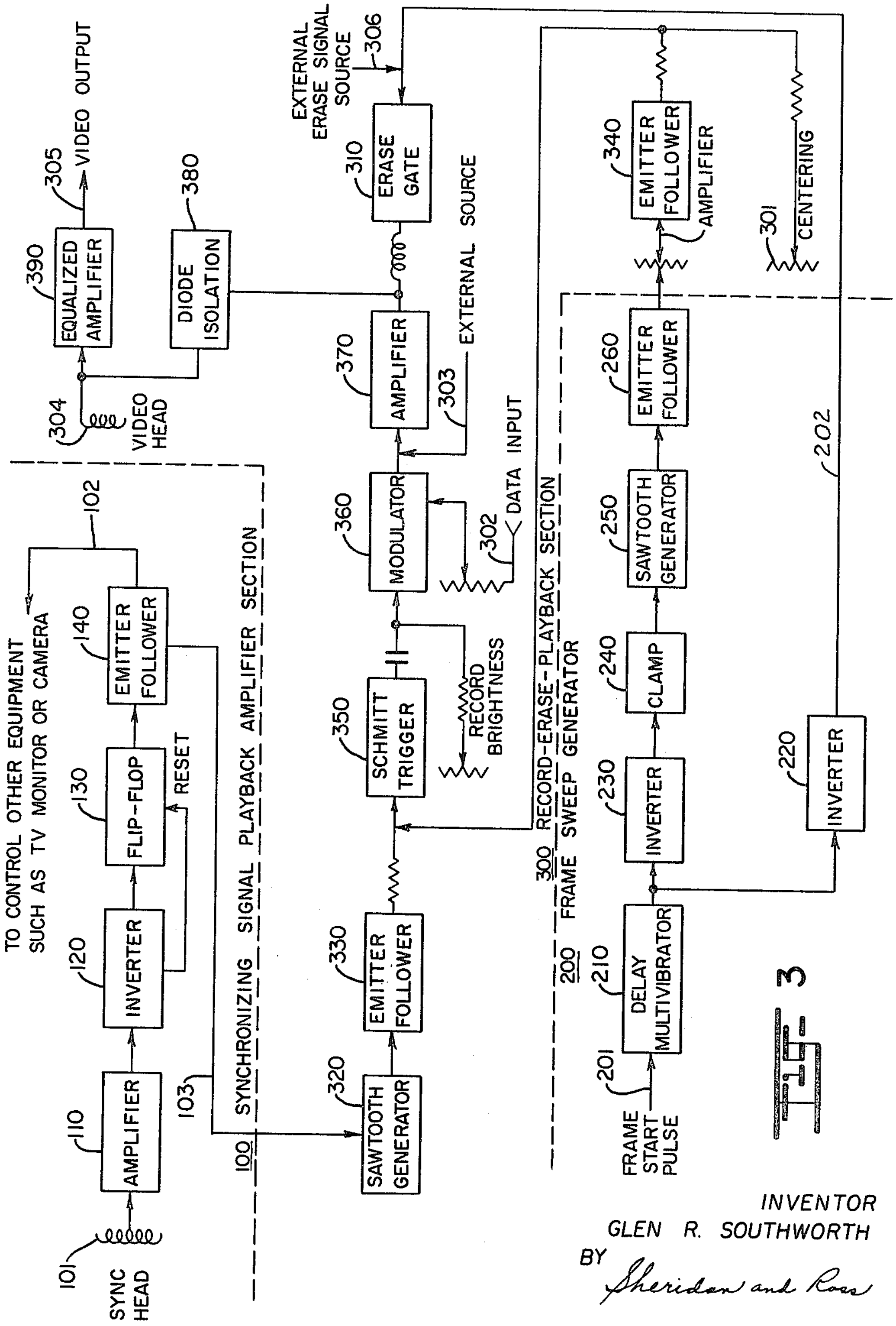
FIG. 3 is a block diagram of the form of scan converter of the present invention.
Figure 4:
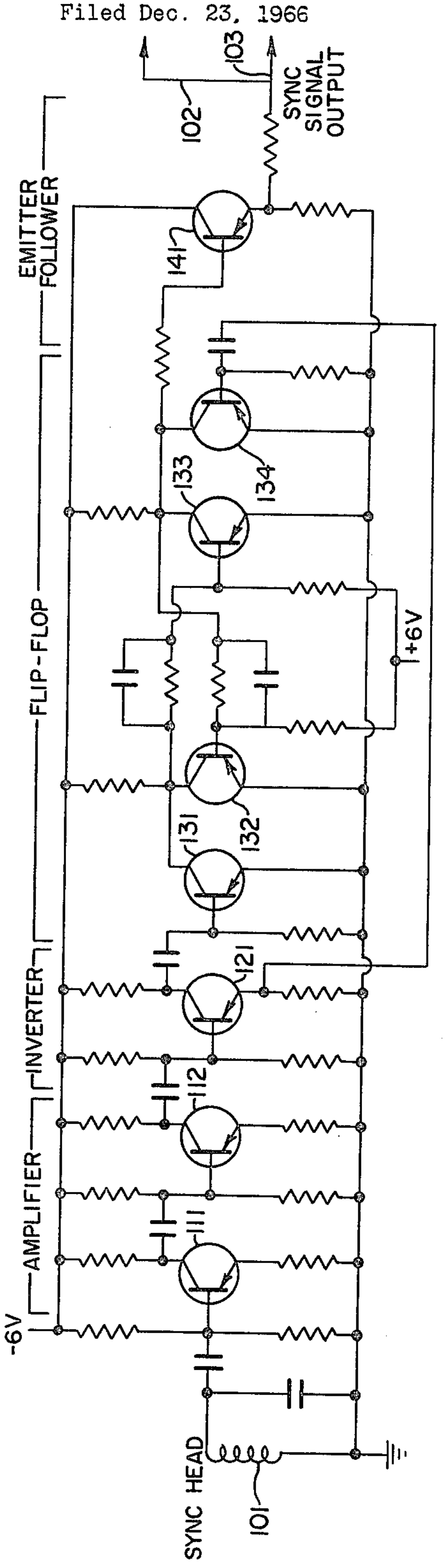
Figure 5:
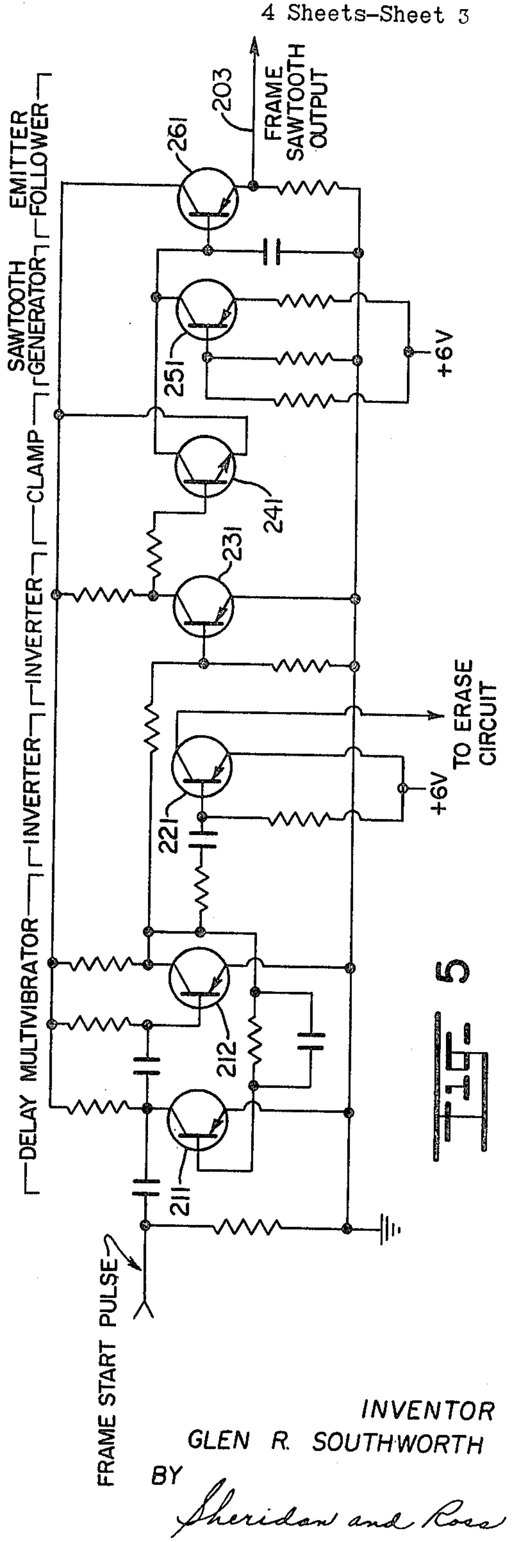
Figure 6:
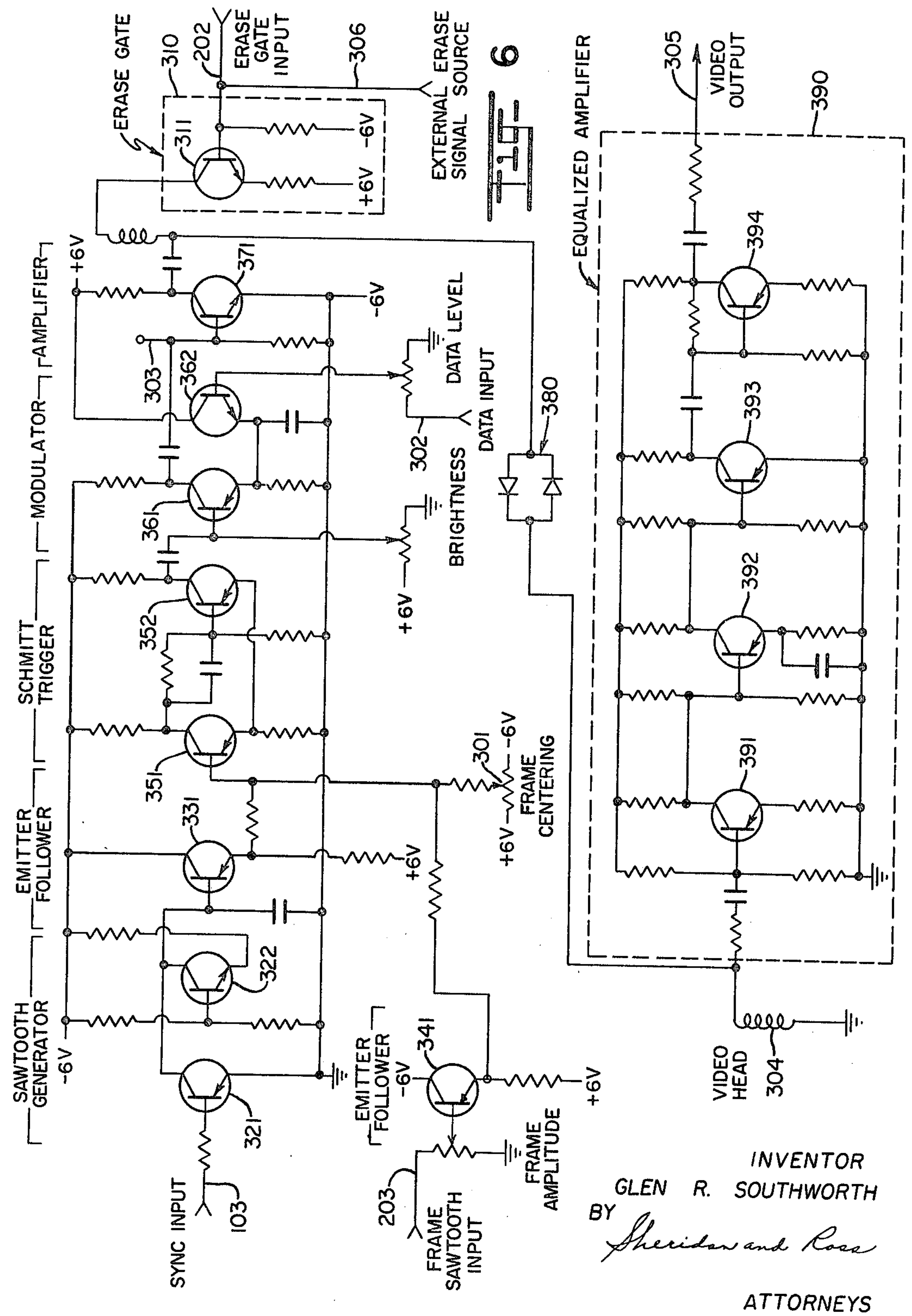

FIGS. 4, 5, and 6 are schematic diagrams of portions of the circuitry of the scan converter of FIG. 3;

FIG. 7 illustrates some of the waveforms in the system of the present invention; and FIG. 8 shows one embodiment of a form of video memory that may be used with the present invention.

Figure 1:
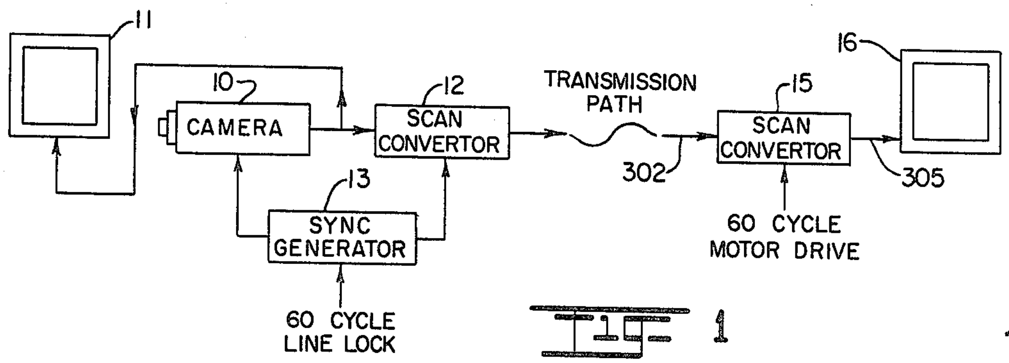
FIG. 1 is a block diagram showing an embodiment of a television scan converter system of the present invention.

In FIG. 1 is shown a television scan converter system with a television camera 10 picking up the information and transmitting it both to a monitor 11 and through a scan converter 12 along a transmission path to be picked up and passed through a scan converter 15 to a viewer 16. Both the camera 10 and scan converter 12 are locked together in operation by sync generator 13 which is locked onto a 60 cycle line. Scan converter 15 is also locked onto a 60 cycle line through a motor drive. It is essential to the operation of the system that the output of scan converter 12 be identical in timing to the input of scan converter 15. This is accomplished by using a common A.C. power source as a common timing element. Other methods of timing may be used in this equipment such as the use of a frequency standard at both ends of the transmission path or the use of a timing signal actually transmitted, amplified and used to drive a disc drive motor.

The scan converter 12 may be any form of scan converter or alternatively a "slow scan" camera may be used obviating the need of scan converter 12. Scan converter 15 is of the type described in this specification.

Figure 2:
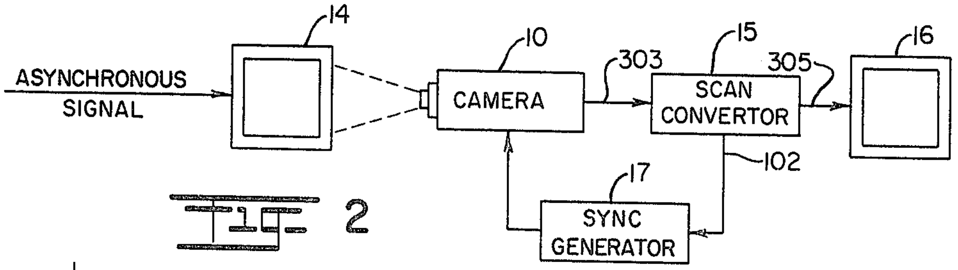
FIG. 2 is a block diagram showing a modified form of the television scan converter system of the present invention.

In an alternative embodiment shown in FIG. 2 asynchronous data may be meaningfully applied to a video memory through use of an intermediate "buffer" storage unit. Typically this can be television camera 10 focused on a cathode ray tube 14, or other light emitting device, with an electron charge on the camera tube target 14 acting as a short term "memory" between successive scans. A scan converter 15 is again used in this embodiment to pass a signal to a receiver viewer 16. A sync generator 17 is used to synchronize operation of camera 10 and scan converter 15 but with camera 10 driven by a common timing base derived from scan converter 15. Alternatively the camera may be driven by pulses derived directly from the scan converter, or a completely different signal generating device may be substituted for the camera, such as an electronic pattern generator, monoscope, flying spot scanner, or other equipment in which the signal timing may be controlled by the scan converter.

As previously stated the operation of the system is dependent upon timing signals coordinating operation of scan converters with cameras and other scan converters in the system. Such timing can be obtained by means already discussed and in addition by means of a synchronous drive motor used to rotate a magnetic disc memory, thus establishing a coarse timing relationship through a common 60 cycle power source, and secondly, the establishment of a timing reference signal on the rotating magnetic disc 20 (FIG. 8) itself, which may be used to synchronize the camera scanning circuits and may subsequently be used to synchronize other circuits or pieces of equipment.

Data may be inserted in such a video disc memory 20 in a variety of ways such as in a series of "dots" or pulses at either very slow or very rapid rates, as an amplitude modulated or frequency modulated signal, by direct D.C. biased recording, in the form of a digitally encoded binary bit stream, or in still some other manner.

In addition to the use of a rotating disc 20, other forms of video memory may be used such as a recirculating delay line, core memory, or other devices, however the preferred embodiment is the rotating magnetic disc or drum and it is a further object of this invention to provide apparatus for a practical implementation for use with such a rotating video memory.

Scan converter 15 of the system embodiments shown in FIGS. 1 and 2 is shown in block diagram form in FIG. 3 with circuitry forming apparatus found in those blocks in FIGS. 4, 5 and 6. The remaining blocks in FIGS. 1 and 2 designate devices well known in the art and do not require more detailed representation here.

Scan converter 15 may be divided into three sections forming (1) the synchronizing signal playback amplifier section 100 (FIG. 4), (2) a frame sweep generator 200 (FIG. 5), and (3) a record-erase-playback section 300 (FIG. 6), interconnected as shown in block form in FIG. 3.

The purpose of the synchronizing signal playback amplifier section 100 is to recover a television timing or synchronizing signal from the video memory device previously discussed at sync head 101. This signal is then taken out at output 102 and may be used to synchronize external television devices such as monitors, cameras, etc., and is also an essential element in providing the appropriate timing pulses for other circuitry which recreates a coherent video signal in one or more separate channels in the video memory.

In the case of use with a rotating video memory using a magnetic disc 20, a composite synchronizing signal containing both horizontal and vertical synchronizing components is recorded on the periphery of the magnetic disc 20. This may be accomplished by first erasing the magnetic material to eliminate possible spurious signals, and then recording a signal as shown among the waveforms of FIG. 7. Waveform 21 depicts the original television synchronizing signal in a somewhat expanded representation. Through a gating circuit in the recording equipment (not shown) a gating signal 22 is used during the recording process to insure that the duration of the recorded signal is essentially equal to the period required for one complete revolution of the magnetic disc 20. This results in a signal 23 within the limitation of gate signal 22 being the resultant recording signal which is applied to sync head 101 from the magnetic disc 20.

During the playback process the magnetic reproducing or sync head (which may previously have been used for both the erase and recording process) reproduces the synchronizing signal 23 as waveform 24 with a series of alternating positive and negative going pulses corresponding to the flux transitions produced by the leading and trailing edges of the originally recorded pulse train 23. Waveform signal 24 is appiled to the base of transistor 111 and through transistor 112 which form an amplifier 110 of conventional design which is used to increase the pulse level to a nominal value, after which it is applied to a phase splitting inverter 120 using transistor 121 for this purpose which produces two trains of pulses of opposite polarity which are fed into opposite sides of flip-flop circuits 130 composed of transistors 131–132 and 133–134 respectively which set and reset these circuits which then reconstitute the original pulse waveshape 23 shown as waveform 25. This waveform output of synchronizing signal playback amplifier section 100 is impedance matched through emitter follower 140, using transistor stage 141, to other circuits.

The synchronizing signal playback amplifier section 100 described above represents only one of many practical methods of obtaining an appropriate synchronizing signal. Other applicable techniques include amplitude modulation of a suitable high frequency carrier, frequency modulation of an appropriate high frequency carrier, recording of a clock frequency at some multiple of the desired television line frequency and subsequent frequency division to obtain the desired synchronizing pulses. The last mentioned method is somewhat more complex than the others but has the advantage of a practical form for higher timing accuracy and allows the system to be interlocked wtih color television equipment using NTSC signals.

A frame sweep generator 200 is used to provide a low frequency time base, typically on the order of a few seconds to several minutes, which is utilized by other circuitry to produce a slowly moving "sliding pulse" which, when applied to the video memory, may be used to recreate raster type patterns. Also incorporated is circuitry providing an "erase" signal to delete previous information contained in the video memory.

Referring to the frame sweep generator 200 shown in the block diagram of FIG. 3 and the circuitry of FIG. 5, a momentary impulse from an external source such as a pushbutton is applied at input 201. This impulse triggers delay multivibrator 210 composed of transistor stages 211 and 212. The time constants of multivibrator 210 are adjusted for a practical embodiment to subsequently produce a pulse having a duration of greater than $\frac{1}{30}$ of a second (greater than one full cycle of the video memory as depicted on FIG. 7 for gate impulse 22 depicted thereon) which is then applied to inverting stage 220, using transistor 221, driving erase gate 310 (FIG. 6) through connection 202. Multivibrator 210 also has an output coupled to another inverter 230 having transistor 231 which actuates clamp 240 composed of transistor 241 which in turn causes low frequency sawtooth generator 250 with transistor 251 to be reset when the input multivibrator 210 is triggered. An emitter follower 260, transistor 261, is connected to the sawtooth generator 250 output to provide impedance matching to other circuits.

In the record-erase-playback section 300 the recording portion is used to produce modulated impulses appropriately timed for insertion into the video memory. Timing pulses at the television horizontal line rate (nominally 15,750 pulses per second for American standards) are obtained from the synchronizing signal playback amplifier section 100 through connection 103 of that unit. These sync pulses are fed into sawtooth generator 320 utilizing transistors 321 and 322 and are used to generate a linear sawtooth waveform at the television horizontal line rate. An emitter follower 330, transistor 331, is used for impedance matching, and the sawtooth signal is subsequently mixed with the signal from emitter follower 260 of frame sweep generator 200 received through connection 203 and emitter follower 340, transistor 341. A variable D.C. voltage from potentiometer 301 is also added at this point and all of the combined voltages are applied to the point of Schmitt trigger circuit 350, transistors 351 and 352, which in turn changes state in accordance with the instantaneous level at its input, this being a function of the combined sawtooth waveforms and the D.C. voltage.

The purpose of the two combined sawtooth waveforms from sawtooth generators 250 and 320 applied to Schmitt trigger circuit 350 is to generate a "sliding pulse" at the television horizontal line rate. The output of Schmitt trigger circuit 350 is then differentiated to produce a narrow spike type of pulse and then applied to transistor 361 of modulator 360 which serves to change the amplitude of the spike in accordance with the level of the data supplied through data input 302 to the base of transistor 362 of modulator 360 when the input to scan converter 15 is from a system having an embodiment as discussed in connection with FIG. 1 or any other coherent data source producing signals that go positive with respect to ground.

When an embodiment of the system is such as described in FIG. 2 then the input data is received at external source input 303 which connects where the output of modulator 360 is applied to the base of transistor 371 of amplifier 370 which amplifying stage is used to increase the pulse level. An external erase signal source consisting of appropriately timed pulses may also be applied at input 306 to connection 202 which connects to the base of transistor 311, and allows the selective erasure of a portion of earlier recorded data. The same, or a different group of appropriately timed pulses may be used to gate input data for purposes of selective recording. The output of amplifier 370 is then mixed with the positive biasing signal from erase gate 310 containing the transistor 311.

The data and erase signals are alternately applied to magnetic video head 304 through a pair of isolation diodes 380 which act as a low impedance for high amplitude signals, and as a high impedance for low amplitude signals. The magnetic head 304 acts as an erasing, recording, and playback device with the diodes 380 serving to isolate the low level playback signal from the recording amplifier 370.

As the data playback level from the video memory is normally quite low, on the order of millivolts, equalized amplifier 390, utilizing transistors 391, 392, 393, and 394 is required to bring this signal up to a useable level. Although this is a conventional process, high frequency intensification may be used along with the amplification in order to compensate for data playback deficiencies. The output from equalized amplifier 390, in either of the system embodiments shown in FIGS. 1 and 2, is fed through output 305 to a receiver viewer 16.

Thus the system described herein with the novel scan converter can accommodate the selection and recording of a single frame of video information from a normal "real time" television signal and the conversion of a "slow scan" television signal to conventional signal rates.

It will be obvious to those skilled in the art that various changes may be made without departing from the scope of the invention and the invention is not to be considered limited to what is shown in the drawings and described in the specification.

What is claimed is:

1. Apparatus for conversion of signals to a standard television rate from any received rate comprising
signal generating means to transmit video signals;
signal conversion means receiving said video signals through operative connection to said signal generating means;
viewing means operatively connected to said signal conversion means to receive video signals therefrom;
synchronizing means to lock together the operation of said signal generating means and said signal conversion means through operative connections to each of said means;
and video memory means for storing information operatively connected to said signal conversion means;
said signal conversion means including
recording circuit means to form timed modulated pulses operatively connected to said video memory means,
synchronizing signal means connected to said recording circuit means to supply a synchronizing signal thereto,
sweep generator means to provide a low frequency time base connected to said recording circuit means,
and playback amplifier means operatively connecting said video memory means to said viewing means.

2. The apparatus in accordance with claim 1, further characterized by
said synchronizing signal means including
magnetic pickup means to pickup a pre-recorded timing signal,
and amplification means connected to said magnetic pickup means.

3. The apparatus in accordance with claim 1, further characterized by
said sweep generator means including
a pulse input means to receive a momentary impulse from an external source,
multivibrator means connected to said pulse input means to receive a signal therefrom to trigger said multivibrator with a delay in the multivibrator means,
a first sawtooth generator means connected to said multivibrator means and reset upon triggering of said multivibrator means.

4. The apparatus in accordance with claim 3, further characterized by
said recording circuit means including
a second sawtooth generator means to generate a linear sawtooth waveform at a standard television rate connected to said synchronizing signal means,
triggering means connected to said first and second sawtooth generator means,
D.C. voltage means connected to said trigger means,
modulator means connected to said trigger means and having an input thereto, to change pulse amplitude therein as a function of the level of said input,
an erase gating means connected to said multivibrator to receive a pulse therefrom,
diode isolation means connected to said erase gating means and said modulator means,
a magnetic head connected to said diode isolation means,
and amplifier means connected to said magnetic head and having an output to said viewing means when isolated from said modulator means and said erase gating means by said diode isolation means.

5. The apparatus in accordance with claim 1, further characterized by
said recording circuit means including
a sawtooth generator means to generate a linear sawtooth waveform at a standard television rate connected to said synchronizing signal means,
trigering means connected to said sawtooth generator means and said sweep generator means,
D.C. voltage means connected to said trigger means,
modulator means connected to said trigger means and having an input thereto, to change pulse amplitude therein as a function of the level of said input,
an erase gating means connected to said sweep generator means to receive a pulse therefrom,
diode isolation means connected to said erase gating means and said modulator means,
a magnetic head connected to said diode isolation means,
and amplifier means connected to said magnetic head and having an output to said viewing means when isolated from said modulator means and said erase gating means by said diode isolation means.

6. In apparatus for conversion of signals to a standard television rate from any received rate,
recording, erasing, and playback means comprising
means for obtaining a sawtooth wave input signal, a second sawtooth wave signal having a linear sawtooth waveform at a selected rate, and a variable D.C. voltage signal;
means for combining both said sawtooth wave signals and said D.C. voltage signal and then modulating the resultant signal as a function of the level of an additional input at the modulating means to produce a data signal;
an erase gating means to produce an erase signal;
diode isolation means having one side connected to said modulating means and to said erase gating means;
and amplifier means connected to said magnetic head and having a video output therefrom when isolated from said modulating means and said erase gating means by said diode isolation means.

7. Apparatus in accordance with claim 6, further characterized by
said erase gating means supplying a positive bias to said magnetic head during erasing process
and means to apply a negative pulse to said magnetic head during recording process.

8. Apparatus in accordance with claim 6, further characterized by
said diode isolation means being a voltage actuated switch.

9. Apparatus in accordance with claim 6, further characterized by
a video memory means for storing information operatively connected to said magnetic head and having a timing signal super-imposed upon a data signal recorded thereon.

References Cited

UNITED STATES PATENTS

| | | | |
|---|---|---|---|
| 3,284,567 | 11/1966 | Southworth | 178—6.8 |
| 3,359,365 | 12/1967 | Kihara. | |

ROBERT L. GRIFFIN, Primary Examiner

D. E. STOUT, Assistant Examiner

U.S. Cl. X.R.

178—6.8